US 8,924,866 B2

(12) United States Patent
Shin et al.

(10) Patent No.: US 8,924,866 B2
(45) Date of Patent: Dec. 30, 2014

(54) METHOD FOR CONTROLLING DISPLAY OF A MESSAGING WINDOW IN A TERMINAL

(75) Inventors: Joon Hun Shin, Seoul (KR); Young Hee Rhee, Seoul (KR); Sang Min Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1328 days.

(21) Appl. No.: 12/133,024

(22) Filed: Jun. 4, 2008

(65) Prior Publication Data

US 2009/0106686 A1 Apr. 23, 2009

(30) Foreign Application Priority Data

Oct. 19, 2007 (KR) ........................ 10-2007-0105691

(51) Int. Cl.
*G06F 3/00* (2006.01)
*H04L 12/58* (2006.01)
*H04M 1/725* (2006.01)

(52) U.S. Cl.
CPC ........... *H04M 1/72552* (2013.01); *H04L 51/04* (2013.01)
USPC ............................ 715/758; 715/792; 715/804

(58) Field of Classification Search
CPC ....... H04L 51/04; H04L 12/581; H04L 51/32; H04L 12/1813; H04L 12/5885; H04L 51/16; H04L 12/588; H04L 51/043; H04L 51/36; H04L 12/586; H04L 12/589; H04N 21/4788; A63F 2300/572; H04M 1/72552
USPC .......................................... 715/758, 792, 804
See application file for complete search history.

(56) References Cited

U.S. PATENT DOCUMENTS

| | | | | |
|---|---|---|---|---|
| 5,996,072 | A | * | 11/1999 | Noll et al. .......................... 713/1 |
| 6,021,312 | A | * | 2/2000 | Klein ............................. 340/7.55 |
| 6,298,045 | B1 | * | 10/2001 | Pang et al. ..................... 370/261 |
| 6,445,682 | B1 | * | 9/2002 | Weitz .............................. 370/257 |
| 6,512,449 | B1 | * | 1/2003 | Aizawa ......................... 340/7.55 |
| 6,583,795 | B1 | * | 6/2003 | Ohyama ....................... 715/785 |
| 7,115,035 | B2 | * | 10/2006 | Tanaka ........................... 463/42 |
| 7,281,215 | B1 | | 10/2007 | Canfield et al. |
| 7,284,202 | B1 | * | 10/2007 | Zenith ........................... 715/744 |
| 7,661,067 | B2 | * | 2/2010 | Chen et al. ..................... 715/752 |
| 8,185,593 | B2 | * | 5/2012 | Mehrotra et al. ............. 709/206 |
| 2003/0134678 | A1 | * | 7/2003 | Tanaka ........................... 463/42 |
| 2003/0152203 | A1 | * | 8/2003 | Berger et al. .............. 379/93.24 |

(Continued)

FOREIGN PATENT DOCUMENTS

| | | |
|---|---|---|
| CN | 1507298 | 6/2004 |
| EP | 1768364 | 3/2007 |
| EP | 1796357 | 6/2007 |
| EP | 1942418 | 7/2008 |

OTHER PUBLICATIONS

European Patent Office Application Serial No. 08008294.4, Search Report dated Feb. 26, 2013, 8 pages.

*Primary Examiner* — Shen Shiau

(74) *Attorney, Agent, or Firm* — Lee, Hong, Degerman, Kang & Waimey

(57) ABSTRACT

A method for controlling display of a messaging window displays a messaging window including a message input region and a message output region, receives a plurality of incoming messages which are successively displayed in the message output region, and selectively freezes the message output region such that incoming messages that are received while the message output region is selectively frozen are not displayed in the message output region.

22 Claims, 19 Drawing Sheets

(56) References Cited

U.S. PATENT DOCUMENTS

| | | | |
|---|---|---|---|
| 2004/0015547 A1* | 1/2004 | Griffin et al. | 709/204 |
| 2004/0015548 A1* | 1/2004 | Lee | 709/204 |
| 2004/0019645 A1* | 1/2004 | Goodman et al. | 709/206 |
| 2004/0078446 A1* | 4/2004 | Daniell et al. | 709/206 |
| 2004/0202117 A1 | 10/2004 | Wilson et al. | |
| 2005/0055416 A1* | 3/2005 | Heikes et al. | 709/207 |
| 2005/0097176 A1* | 5/2005 | Schatz et al. | 709/206 |
| 2005/0114753 A1* | 5/2005 | Kumar et al. | 715/500.1 |
| 2006/0064434 A1 | 3/2006 | Gilbert et al. | |
| 2006/0066567 A1* | 3/2006 | Scharenbroch et al. | 345/156 |
| 2006/0161853 A1* | 7/2006 | Chen et al. | 715/758 |
| 2007/0097083 A1 | 5/2007 | Seok | |
| 2007/0143472 A1* | 6/2007 | Clark et al. | 709/224 |
| 2007/0174407 A1* | 7/2007 | Chen et al. | 709/207 |
| 2007/0186172 A1* | 8/2007 | Sego et al. | 715/753 |
| 2007/0198645 A1* | 8/2007 | Chen et al. | 709/207 |
| 2007/0198646 A1* | 8/2007 | Chen et al. | 709/207 |
| 2007/0245249 A1* | 10/2007 | Weisberg | 715/758 |
| 2007/0300169 A1* | 12/2007 | Jones et al. | 715/764 |
| 2008/0153529 A1* | 6/2008 | O'Neill et al. | 455/512 |
| 2008/0228894 A1* | 9/2008 | Chen et al. | 709/207 |
| 2008/0250109 A1* | 10/2008 | Jakobson | 709/206 |
| 2008/0256190 A1* | 10/2008 | Ryan et al. | 709/206 |
| 2009/0016512 A1* | 1/2009 | Bryant et al. | 379/202.01 |
| 2009/0024932 A1* | 1/2009 | Ryan et al. | 715/753 |
| 2009/0031223 A1* | 1/2009 | Izumi | 715/758 |
| 2009/0094343 A1* | 4/2009 | Mehrotra et al. | 709/207 |

* cited by examiner

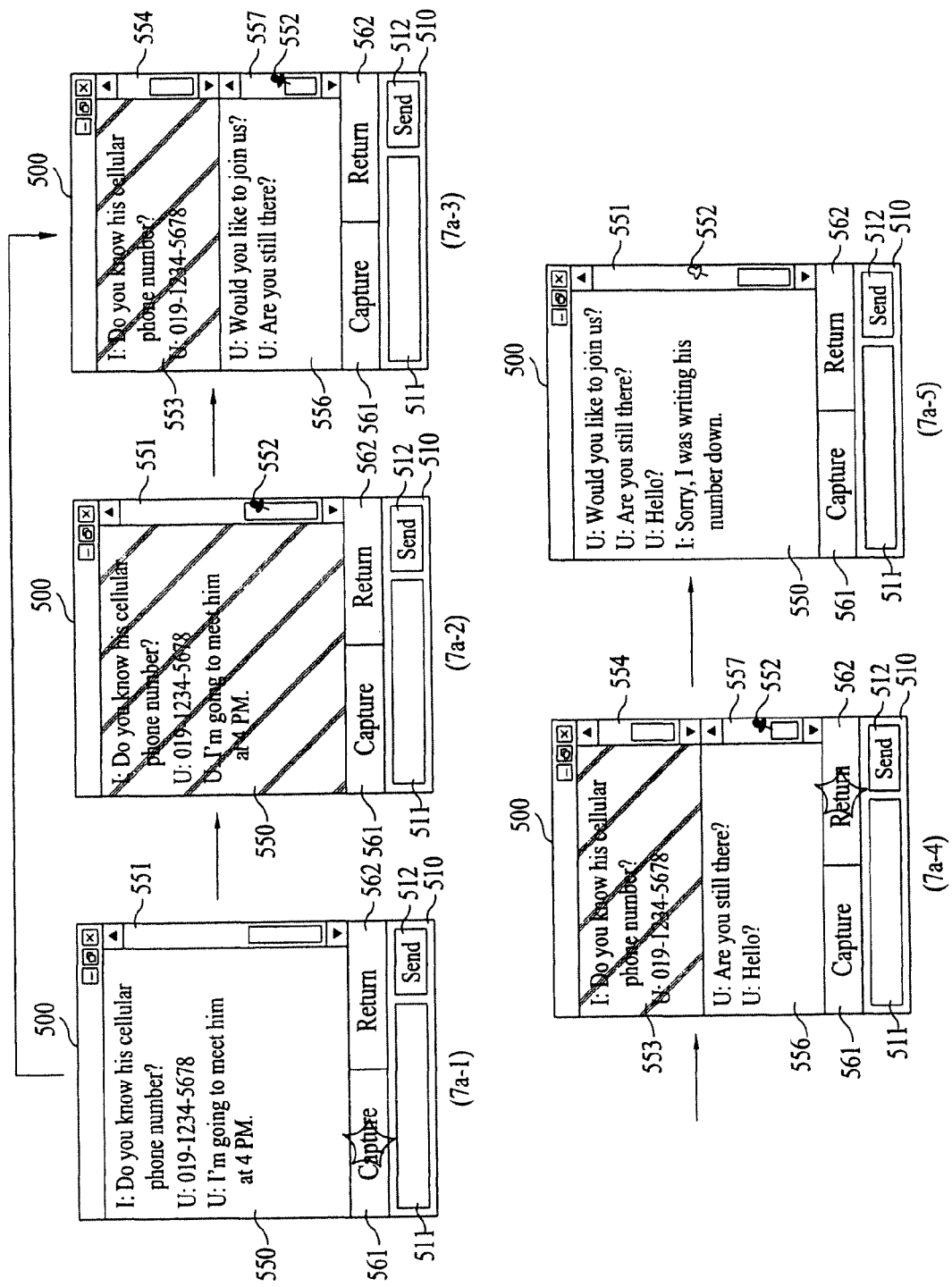

METHOD FOR CONTROLLING DISPLAY OF A MESSAGING WINDOW IN A TERMINAL

CROSS-REFERENCE TO RELATED APPLICATIONS

Pursuant to 35 U.S.C. §119(a), this application claims the benefit of earlier filing date and right of priority to Korean Application No. 10-2007-0105691, filed on Oct. 19, 2007, the contents of which are hereby incorporated by reference herein in their entirety.

FIELD OF THE INVENTION

The present invention relates to a method for controlling display of a messaging window in a terminal. Although the present invention is suitable for a wide scope of applications, it is particularly suitable for implementing instant message communication by taking user's convenience into consideration.

DISCUSSION OF THE RELATED ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

There are ongoing efforts to support and increase the functionality of mobile terminals. Such efforts include software and hardware improvements, as well as changes and improvements in the structural components which form the mobile terminal.

Recently, a terminal configured to perform instant message communication with another party has been introduced. In the course of the instant message communication with another party, important information to be recorded such as a phone number, a mailing address, and an e-mail address is communicated and then displayed.

However, the important information quickly disappears from an instant message window as the instant message communication with the other party continues. Therefore, a terminal user must inconveniently scroll down the displayed messages on the instant message window in order to display the important information which has disappeared.

Moreover, if a new message is received after the important information is scrolled and displayed on the instant message window again, the newly received message is displayed on the instant message window, thereby causing the important information to again disappear from the instant message window.

SUMMARY OF THE INVENTION

Accordingly, the present invention is directed to a terminal and control method thereof that substantially obviate one or more problems due to limitations and disadvantages of the related art.

In one aspect of the present invention, a method for controlling display of a messaging window includes displaying a messaging window comprising a message input region and a message output region, receiving a plurality of incoming messages that are successively displayed in the message output region, and selectively freezing the message output region such that incoming messages that are received while the message output region is selectively frozen are not displayed in the message output region.

The method may further include at least one of continuously displaying the selectively frozen message output region until a new outgoing message is input to the message input region, continuously displaying the selectively frozen message output region until an input for ending display of the selectively frozen message output region is received, saving the selectively frozen message output region for later retrieval, displaying an indicator indicating the selective freezing of the message output region, and retrieving the selectively frozen message output region in response to selection of the indicator.

Preferably, the selectively frozen message output region disappears from the message output region once input of the new outgoing message to the message input region begins, and the method may further include displaying at least one incoming message received since the message output region was selectively frozen in the message output region.

Also preferably, the selectively frozen message output region disappears from the message output region once the input for ending display of the selectively frozen message output region is received, and the method may further include displaying at least one incoming message received since the message output region was selectively frozen in the message output region.

The method may further include prompting a user to save the selectively frozen message output region when the input for ending display of the selectively frozen message output region is received and saving at least one message in the selectively frozen message output region in response to a user input to save the at least one message.

In another aspect of the present invention, a method for controlling display of a messaging window includes displaying a messaging window comprising a message input region and a message output region, receiving a plurality of incoming messages that are successively displayed in the message output region, selectively freezing at least a portion of the message output region, and displaying the selectively frozen portion of the message output region on the messaging window.

The method may further include at least one of displaying incoming messages which are received while the message output region is selectively frozen in the message output region, displaying the message output region divided into at least a frozen message output region and a recent message output region after the message output region is selectively frozen, adjusting sizes of the frozen message output region and the recent message output region, saving the selectively frozen message output region for later retrieval, and prompting a user to save the selectively frozen message output region before the messaging window is closed, and saving at least on message in the selectively frozen message output region in response to a user input.

Preferably, the recent message output region continuously displays new messages received or transmitted such that the display is not interrupted by the selectively frozen portion of the message output region displayed in the frozen message output region. The method may further include at least one of displaying the message output region without the frozen message output region in response to a user input for returning to the message output region that successively displays a plurality of incoming and transmitted messages, prompting a user to save at least one message in the selectively frozen message output region when the user input is received, and saving the at least one message in response to a user input to save the at least one message.

Also preferably, the frozen message output region and the recent message output region are displayed as a side-by-side view or a top-and-bottom view.

Alternatively, a plurality of message output regions are selectively frozen, each of the plurality of message output regions including at least one different message and the method may further include at least one of displaying at least one indicator indicating the selective freezing of the message output region, wherein a number of indicators displayed indicates a number of the plurality of the message output regions that were selectively frozen and retrieving one of the plurality of message output regions that were selectively frozen in response to selection of the at least one indicator.

In yet another aspect of the present invention, a terminal includes a display unit for displaying a messaging window including a message input region and a message output region, a communication unit for performing message communication, a memory unit for storing at least one message, and a control unit for selectively freezing at least a portion of the message output region during the message communication, and displaying at least one selectively frozen message on a screen of the display unit.

Preferably, the control unit prevents incoming messages that are received while the at least a portion of the message output region is frozen from being displayed in the message output region.

Also preferably, the control unit divides the message output region into at least a frozen message output region and a recent message output region, and controls the recent message output region to display incoming messages received while the selectively frozen portion of the message output region is displayed in the frozen message output region.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The above and other features and advantages of the present invention will become more apparent by describing in detail preferred embodiments thereof with reference to the attached drawings.

FIG. 7A and FIG. 7B are diagrams of a display screen on which a method of controlling a mobile terminal according to another embodiment of the present invention is implemented.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably. In addition, the words "capturing" and "freezing" are used interchangeably.

Figure 1:
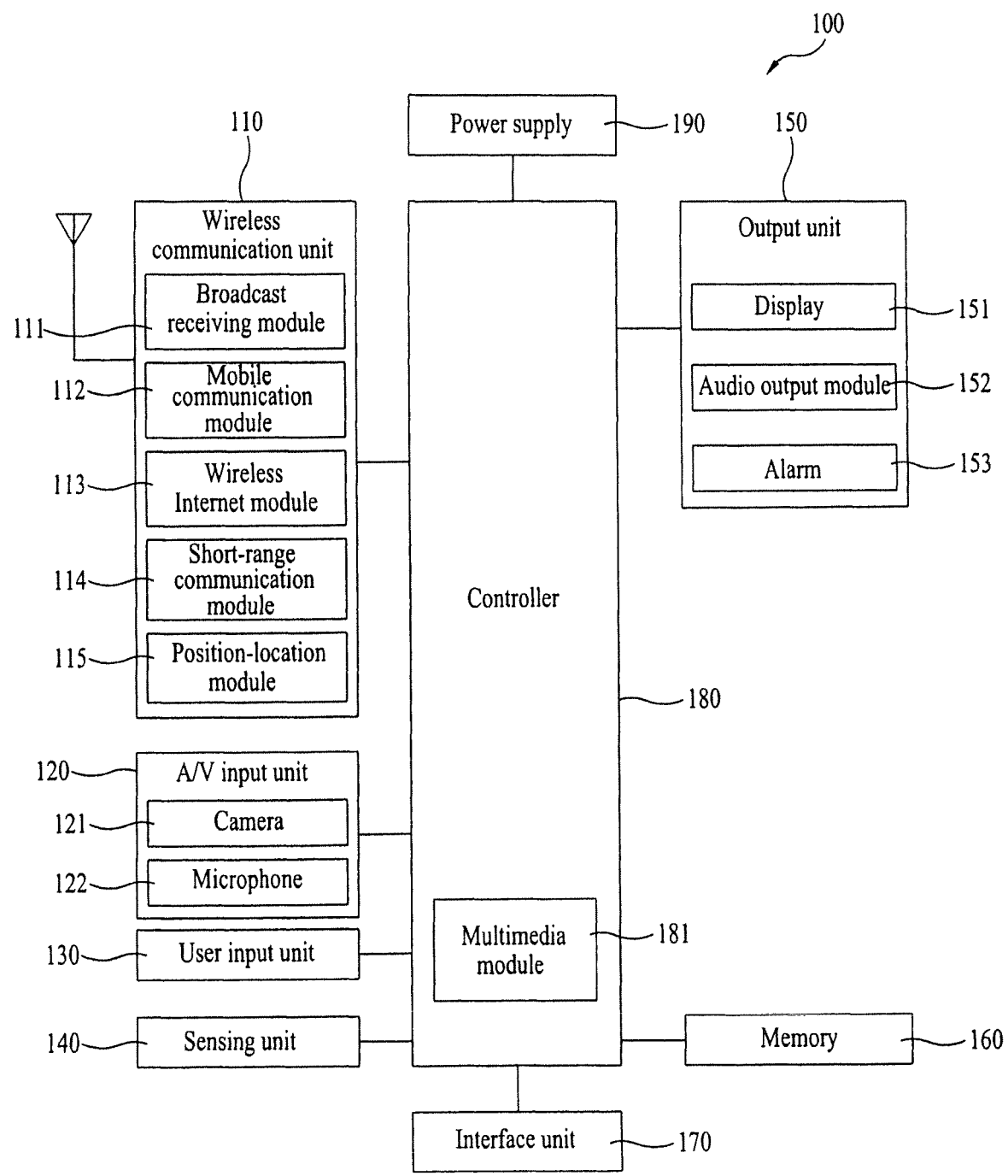
FIG. 1 is a block diagram of a mobile terminal according to an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. Hereinafter, the wireless communication unit 110 and wire communication unit can be commonly referred to as a communication unit. The communication unit allows the terminal user to perform instant message communication with another party.

The broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

Examples of the broadcast associated information include information associated with a broadcast channel, a broadcast program, and a broadcast service provider. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

The mobile communication module 112 communicates wireless signals with one or more network entities, such as a base station or Node-B. Such signals may represent, for example, audio, video, multimedia, control signaling, and data.

The wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. Hereinafter, the wireless internet module 113 and wire internet module can be commonly referred to as an internet module.

The short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as Bluetooth and ZigBee.

The position-location module 115 identifies or otherwise obtains the location of the mobile terminal 100. This module may be implemented using global positioning system (GPS) components which cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

The microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad such as a static pressure/capacitance, a jog wheel and a jog switch. A specific example is one in which the user input unit 130 is configured as a touchpad in cooperation with a touch screen display, which will be described in more detail below.

The sensing unit 140 provides status measurements of various aspects of the mobile terminal 100. For example, the sensing unit may detect an open/close status of the mobile terminal 100, relative positioning of components, such as a display and keypad, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output ports, a card socket for coupling to a memory card, a subscriber identity module (SIM) card, a user identity module (UIM) card, or a removable user identity module (RUIM) card).

The output unit 150 generally includes various components that support the output requirements of the mobile terminal 100. The display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

The memory 160 is generally used to store various types of data to support the processing, control, and storage requirements of the mobile terminal 100. Examples of such data include program instructions for applications operating on the mobile terminal 100, contact data, phonebook data, messages, pictures, and video. The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
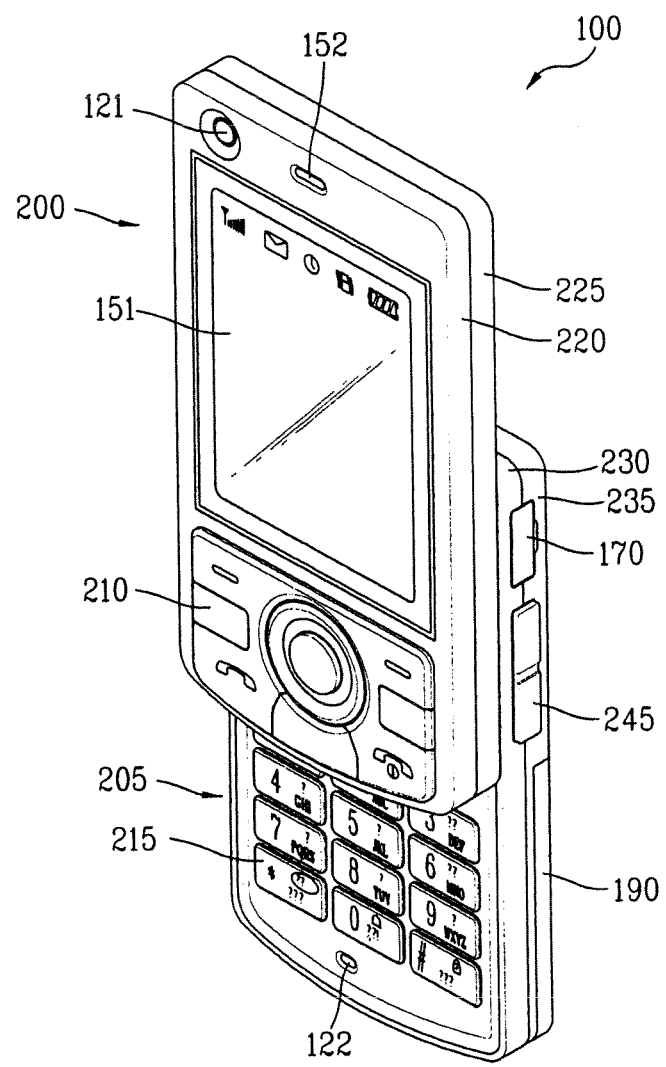
FIG. 2 is a perspective diagram of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 is implemented using function keys 210 and a keypad 215. The function keys 210 are associated with the first body 200, and the keypad 215 is associated with the second body 205. The keypad includes various keys, such as numbers, characters, and symbols to enable a user to place a call, prepare a text or multimedia message, and otherwise operate the mobile terminal 100.

The first body 200 slides relative to the second body 205 between open and closed positions. In a closed position, the first body 200 is positioned over the second body 205 in such a manner that the keypad 215 is substantially or completely obscured by the first body. In the open position, user access to the keypad 215, as well as the display 151 and function keys 210, is possible. The function keys 210 are conveniently configured for a user to enter commands, such as start, stop and scroll.

The mobile terminal 100 is operable in either a standby mode, in which it is able to receive a call or message and to receive and respond to network control signaling, or an active call mode. Typically, the mobile terminal 100 functions in the standby mode in the closed position and in the active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti).

One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to first body 200 such as by rotation or swiveling.

The function keys 210 are positioned adjacent to a lower side of the display 151, which is shown implemented as an LCD or OLED. The display may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of a user input unit, positioned along the side of second body. Preferably, the side keys 245 are configured as hot keys, such that the side keys are associated with a particular function of the mobile terminal 100. An interface unit 170 is shown positioned adjacent to the side keys 245 and a power supply 190 in a form of a battery is shown located on a lower portion of the second body 205.

Figure 3:
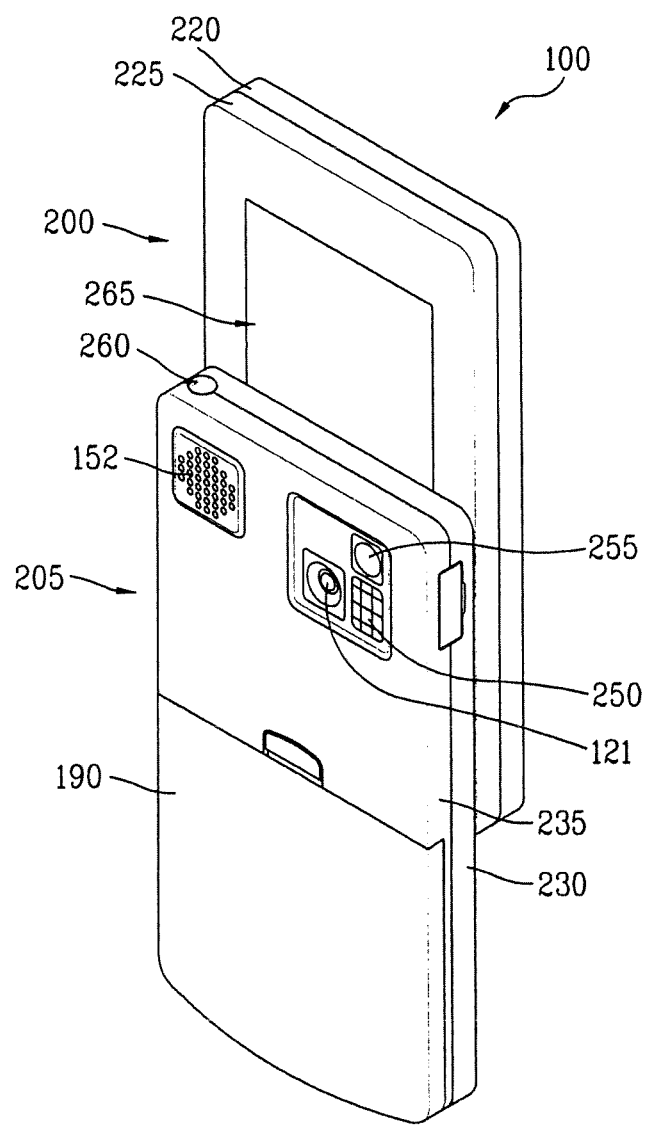
FIG. 3 is a perspective diagram of a backside of the mobile terminal shown in FIG. 2.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 (FIG. 2). Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 (FIG. 1). The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205, may be modified as required or desired. In general, some or all of the components of one body may alternatively be implemented on the other body. In addition, the location and relative positioning of such components are not critical to many embodiments and, therefore, the components may be positioned at locations which differ from those shown by the representative figures.

The mobile terminal 100 of FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
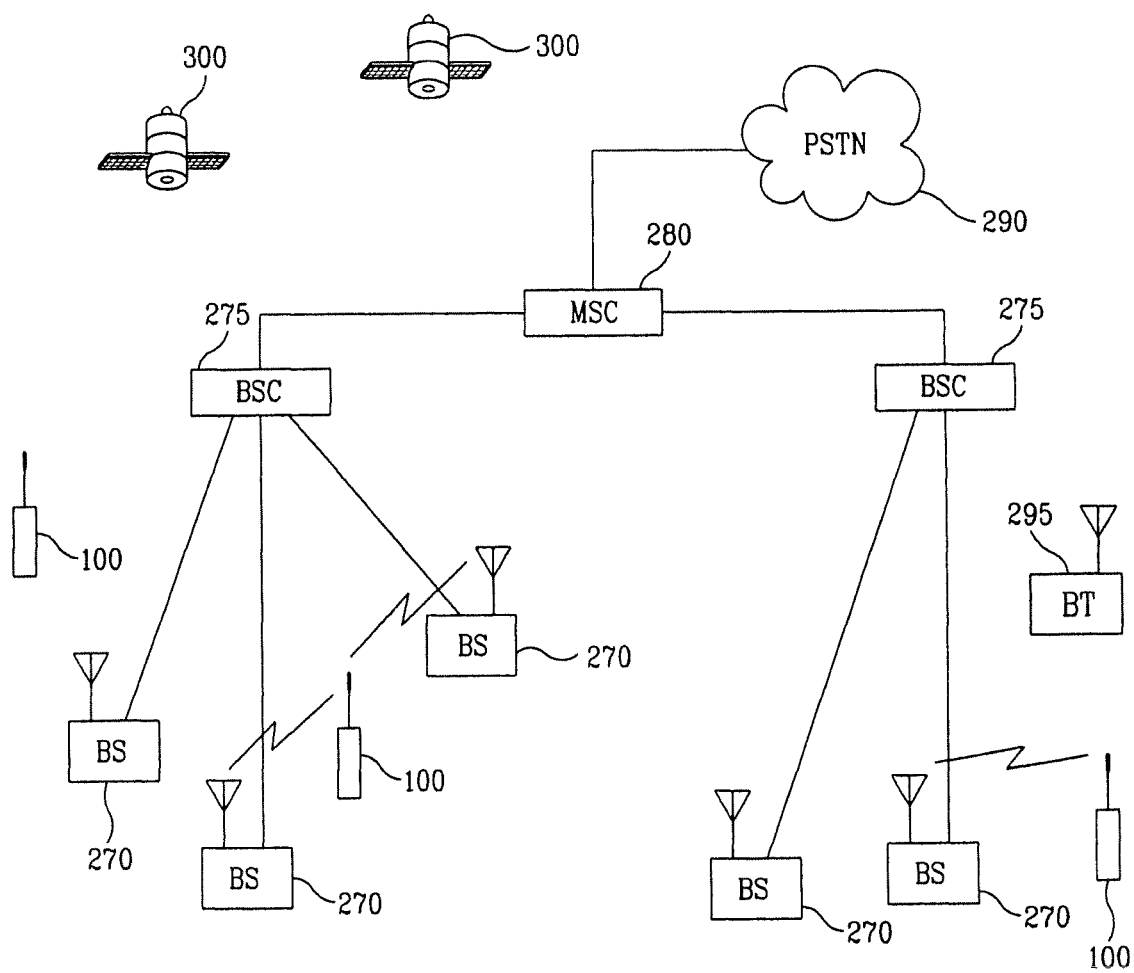
FIG. 4 is a block diagram of a wireless communication system in which a mobile terminal according to the present invention is operable.

Referring to FIG. 4, a CDMA wireless communication system is shown having a plurality of mobile terminals 100, a plurality of base stations 270, a plurality of base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omni-directional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275 and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 (FIG. 1) of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications.

Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280 and the MSC 280 interfaces with the BSCs 275. The BSCs 275 control the base stations 270 to transmit sets of forward-link signals to the mobile terminals 100.

In the following description, a control method applicable to the above-configured mobile terminal 100 is explained with respect to various embodiments. It is understood that the following embodiments can be implemented independently or through combinations thereof.

In the following description, 'a message is captured and displayed on an instant message window' means that a prescribed message temporarily stored in the course of the instant message communication stays on a display screen without disappearing from the display screen such that the message is displayed continuously even if new messages are transmitted or received. The captured message can be temporarily stored as a text or image.

A method of controlling a mobile terminal 100 according to a first embodiment of the present invention is explained with reference to FIG. 5 and FIG. 6. The flowchart of FIG. 5 illustrates a method of controlling a mobile terminal 100 according to first to third embodiments of the present invention and the diagram of FIG. 6 illustrates a display screen on which a method of controlling a mobile terminal 100 according to the first embodiment of the present invention is implemented.

Figure 5:
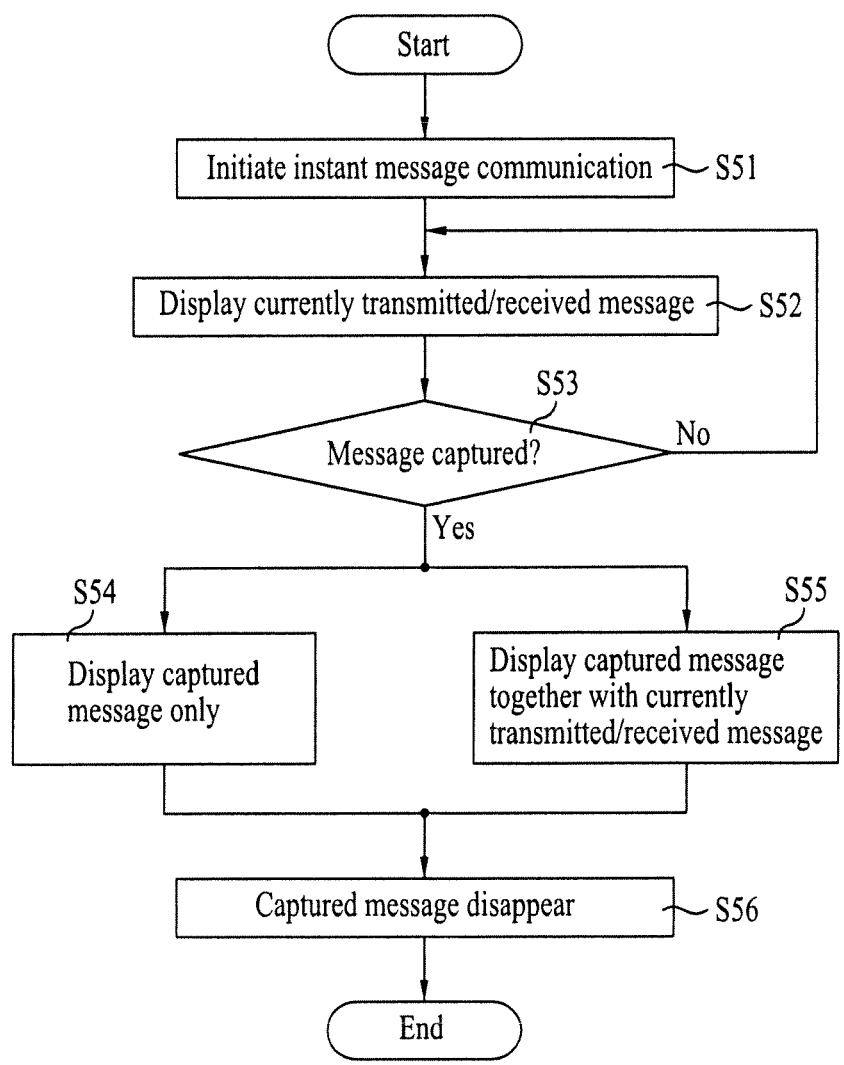
FIG. 5 is a flowchart illustrating a method of controlling a mobile terminal according to embodiments of the present invention.
Figure 6:
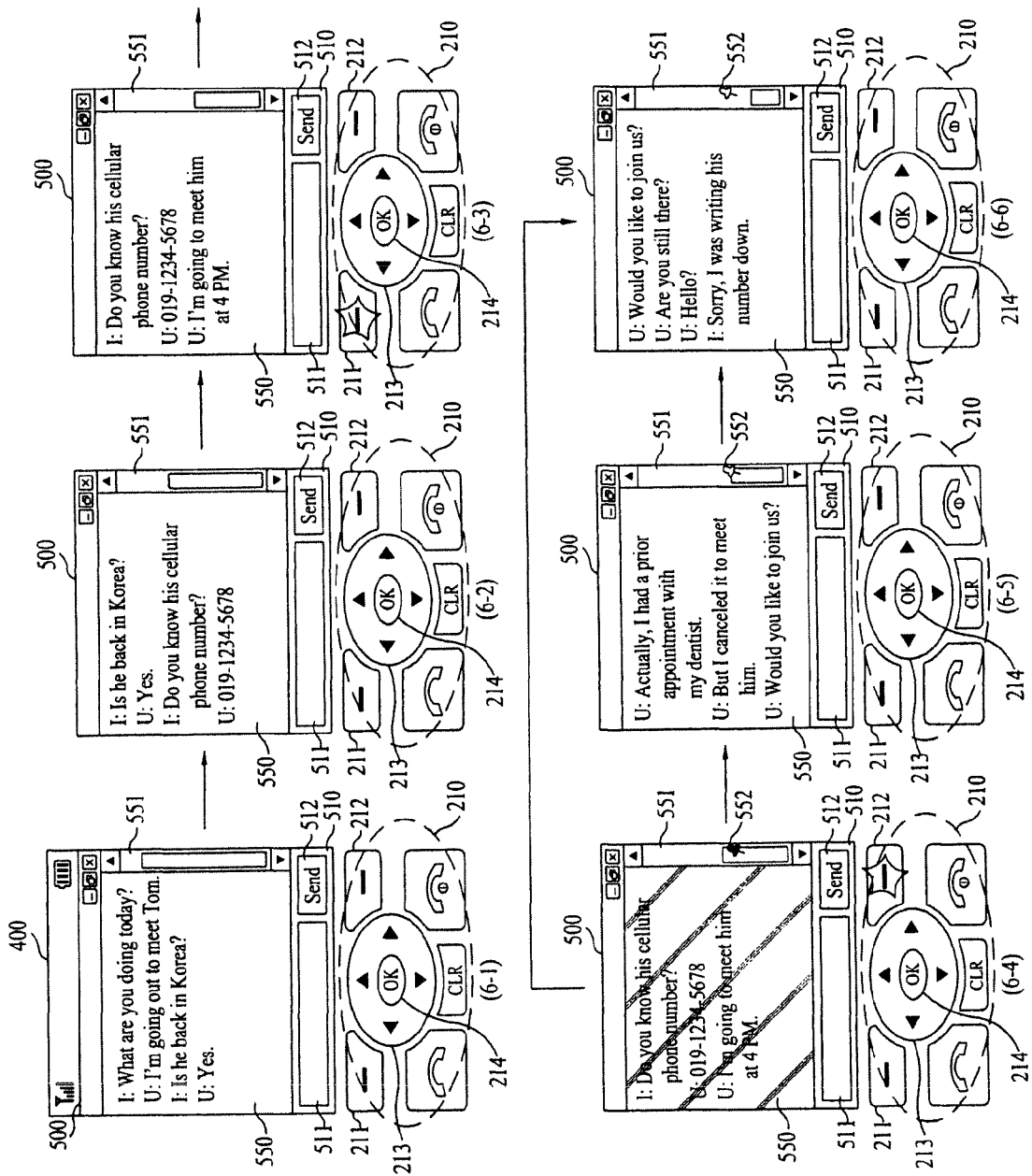
FIG. 6 is a diagram of a display screen on which a method of controlling a mobile terminal according to an embodiment of the present invention is implemented.

Referring to (6-1) of FIG. 6, a mobile terminal 100 is in the course of instant message communication with another terminal and an instant message window 500 is displayed on a display screen 400 of the mobile terminal [S51 of FIG. 5]. For clarity, only the instant message window 500 is shown in the rest of the drawings.

The instant message window 500 mainly includes a message input region 510 and a message output region 550. On the message input region 510, there is a message input box 511, where a message is input and viewed by a user before being transmitted to the other terminal, and a 'Send' icon 512 for sending the user-input message to the other terminal.

Inputting the message and selecting the 'Send' icon can be carried out via the user input unit 130. When the display 151 includes a touch screen, a message is input via a virtual keypad for character inputs on the touch screen or the 'Send' icon displayed on the touch screen may be directly touched to select the 'Send' icon. In the following described first embodiment of the present invention, the display 151 does not include the touch screen since the present invention may be implemented in a mobile terminal 100 without a touch screen.

A scroll bar 551 and messages transmitted/received by the mobile terminal 100 user are displayed on the message output region 550. In this case, the scroll bar 551 is provided to scroll the transmitted/received messages.

A portion 210 of the user input unit 130 for manipulations associated with the instant message communication is positioned below the display screen 400. The portion 210 of the user input unit 130 includes a first soft key 211, a second soft key 212, a navigation key 213, and an 'OK' key 214. The first and second soft keys 211, 212 are used to capture an instant message which will be explained in detail later. The navigation key 213 is provided to manipulate the scroll bar 551 and the 'OK' key 214 is provided to select the 'Send' icon.

Referring to (6-2) and (6-3) of FIG. 6, when a new message is transmitted/received by the mobile terminal 100 user, the new message is displayed on the message output region 550 while the scroll bar 551 is scrolled down as soon as messages on the message output region 550 are scrolled up [S52].

Referring to (6-3) of FIG. 6, the user selects the first soft key 211 [S53] to capture the displayed messages. Subsequently, the messages displayed within the message output region shown in (6-3) of FIG. 6 are captured and displayed [S54], as shown in (6-4) of FIG. 6.

A capture indicator 552 indicating that the messages are captured is displayed on the instant message window 500. The capture indicator 552 can be displayed on any position of the instant message window 500. In (6-4) of FIG. 6, the capture indicator 552 is displayed on the scroll bar 551. Moreover, the capture indicator 552 is displayed on the scroll bar 551 to indicate a position of the captured message within the whole instant message.

In (6-4) of FIG. 6, even if messages are transmitted/received by the mobile terminal 100 or by the other terminal in the course of displaying the captured messages, it is exemplarily shown that the transmitted/received messages are not displayed.

The user selects the second soft key 212 to transition from the view of the captured messages to the view of the current messages. Referring to (6-5) of FIG. 6, the messages transmitted/received after the captured messages are displayed on the message output region 500. Subsequently, in order to display the most recently transmitted/received messages one-by-one, the messages transmitted/received right after the capturing timing point can be automatically or manually scrolled up one-by-one.

Referring to (6-5) of FIG. 6, the messages transmitted/received right after the capturing timing point can be configured for display as soon as the captured message instantly disappears from the message output region 550. Alternatively, the messages transmitted/received right after the capturing timing point can be configured for display on the message output region 550 by scrolling up as soon as the captured message disappears from the message output region 550.

Referring to (6-6) of FIG. 6, currently transmitted/received messages are displayed on the message output region 550 [S56]. When the second soft 212 key is selected, the most recently transmitted/received messages may be displayed while the captured message disappears from the message output region 550. In particular, the message output region 550 as shown in (6-4) of FIG. 6 may directly turn into the message output region 550 shown in (6-6) of FIG. 6.

If the second soft key 212 is selected after the captured message has disappeared, the captured message is displayed on the message output region 550 again. If the second soft key 212 is selected again, the captured message disappears again.

In the above description, the captured messages are configured to disappear from the message output region 550 if the second soft key 212 is selected. Furthermore, when the message input region 510 is selected for a new message input or message input is initiated, the captured messages are configured to disappear. This configuration is applicable to the other embodiments of the present invention as well.

The following description continues on the assumption that the display unit 151 includes a touch screen. However, it is understood that operations of the following embodiments are not limited to a touch screen.

Figure 7B:
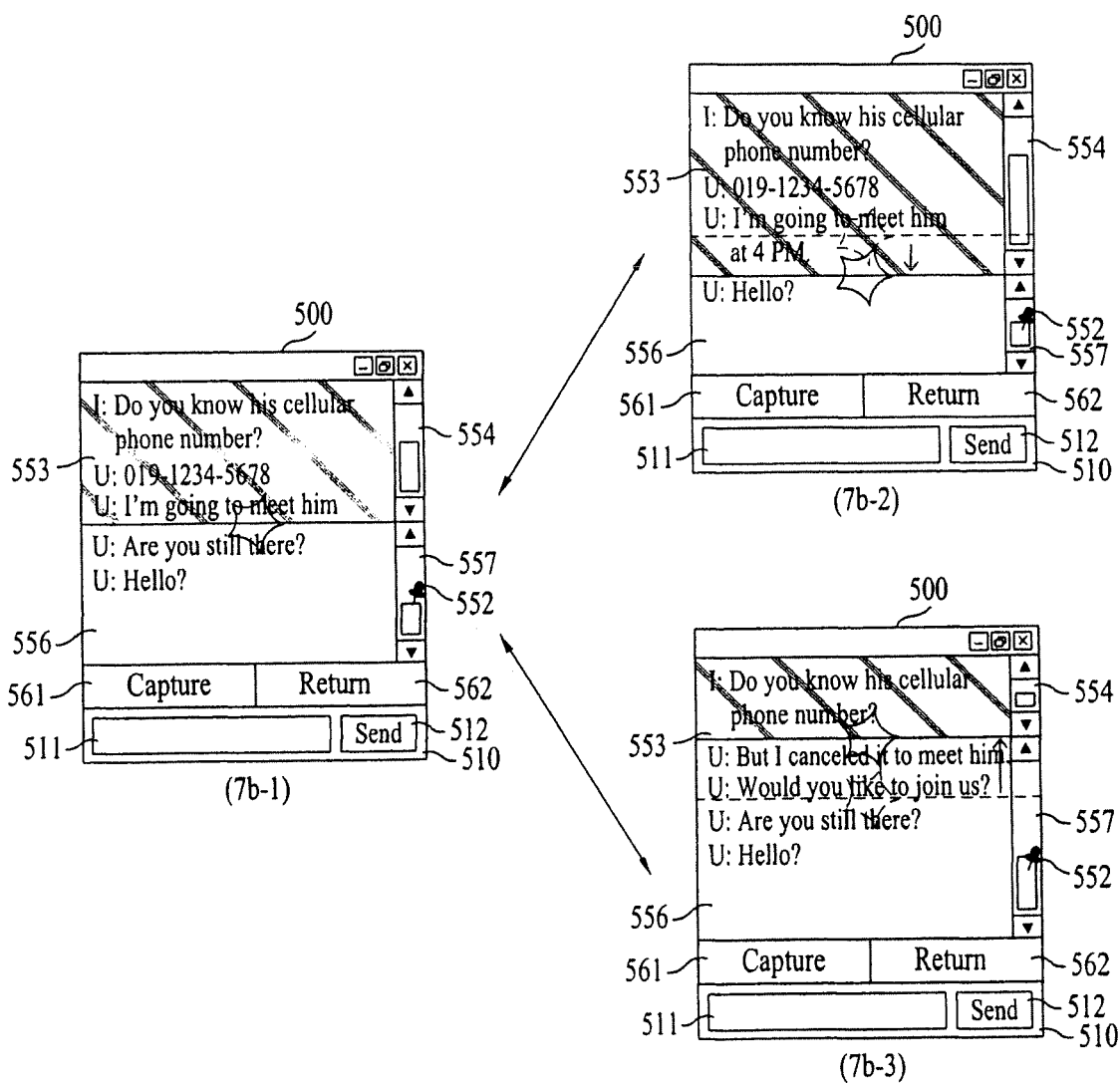

A method of controlling a mobile terminal 100 according to a second embodiment of the present invention is explained with reference to FIG. 5, FIG. 7A and FIG. 7B. FIG. 7A and FIG. 7B are diagrams of a display screen on which a method of controlling a mobile terminal 100 according to the second embodiment of the present invention is implemented.

Referring to (7a-1) of FIG. 7A, the instant message window 500 is displayed on the display screen of the mobile terminal 100 while the mobile terminal is performing instant message communication with another terminal [S51]. Messages currently transmitted/received by a mobile terminal 100 user or another party are displayed on the message output region 550 of the instant message window 500 [S52].

First and second icons 561, 562 for a message capture are displayed on the instant message window 500. The first and second icons 561, 562 carry out functions similar to those of the aforesaid first and second soft keys 211, 212. Therefore, even if the display unit 151 includes the touch screen, the first and second soft keys are usable without displaying the first and second ions 561, 562 on the instant message window 500.

Subsequently, the user touches the first icon 561 [S53] to capture the displayed messages. Referring to (7a-2) of FIG. 7A, the messages displayed within the message output region 550 are captured and displayed.

Subsequently, if there is a message newly transmitted/received by the mobile terminal 100 user or the other party after the capturing timing point, the message output region 550, as shown in (7a-3) of FIG. 7A, is divided into two regions. Specifically, the message output region 550 is divided into a captured message output region 553 and a currently transmitted/received message output region 556.

The captured messages are displayed continuously on the captured message output region 553. The user is able to view a specific portion of the captured messages by touching and dragging a scroll bar 554 at the captured message output region 553.

Currently transmitted/received messages are displayed on the currently transmitted/received message output region 556. The user is able to view a specific portion of the currently transmitted/received messages by touching and dragging a scroll bar 557 at the currently transmitted/received message output region 556.

As the instant message communication continues, the message displayed on the captured message output region 553, as shown in (7a-4) of FIG. 7A, is maintained intact. Yet, a message newly transmitted/received by the mobile terminal 100 user or the other party is displayed on the currently transmitted/received message output region 556. Hence, the user is able to view the captured message while simultaneously viewing the newly transmitted/received message(s) [S55].

Subsequently, the user selects the second icon 562 to close the captured message output region 553. Referring to (7a-5) of FIG. 7A, the currently transmitted/received messages are fully displayed on the message output region 550 [S56].

In the above description, when a new message is transmitted/received by the mobile terminal 100 user or the other party after the capturing timing point in the course of displaying the captured messages as shown in (7a-2) of FIG. 7A, the message output region 550 is divided. Specifically, the message output region 550 is divided into the captured message output region 553 and the currently transmitted/received message output region 556 as shown in (7a-3) of FIG. 7A. Alternatively, the message output region 550 may be directly divided into the captured message output region 553 and the currently transmitted/received message output region 556 regardless of the presence or absence of a new message transmitted/received.

The captured message output region 553 and the currently transmitted/received message output region 556 may be mutually adjusted in size. This is explained with reference to FIG. 7B.

Referring to (7b-1) of FIG. 7B, the captured message output region 553 and the currently transmitted/received message output region 556 are displayed on the instant message window 500. If the user touches and drags a boundary line between the two regions, sizes of the two regions, as shown in (7b-2) or (7b-3) of FIG. 7B, are mutually adjusted. It is apparent to those skilled in the art that the size adjustment may be implemented by methods different from the method shown in FIG. 7B.

Figure 8A:
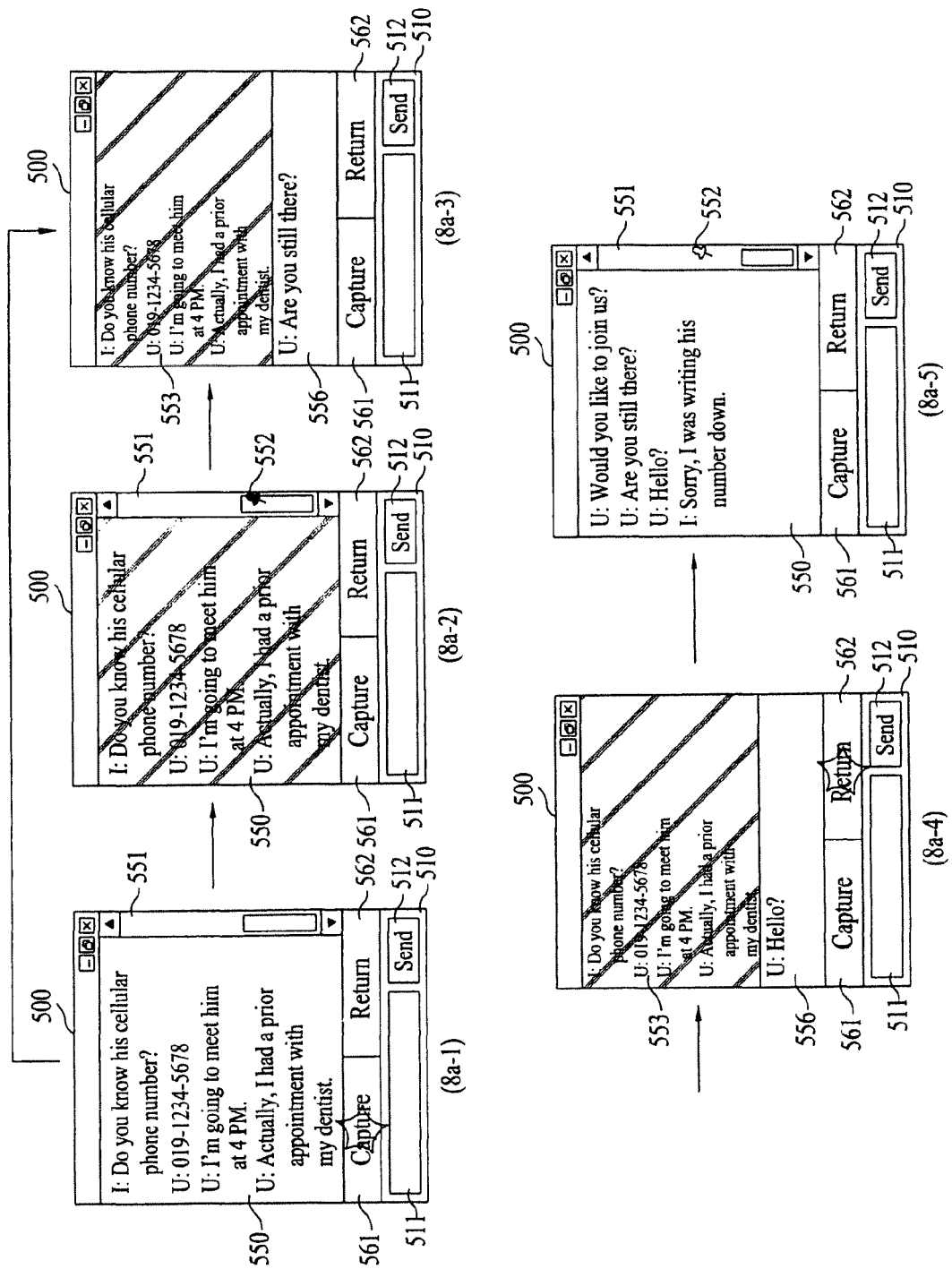
FIG. 8A and FIG. 8B are diagrams of a display screen on which a method of controlling a mobile terminal according to another embodiment of the present invention is implemented.
Figure 8B:
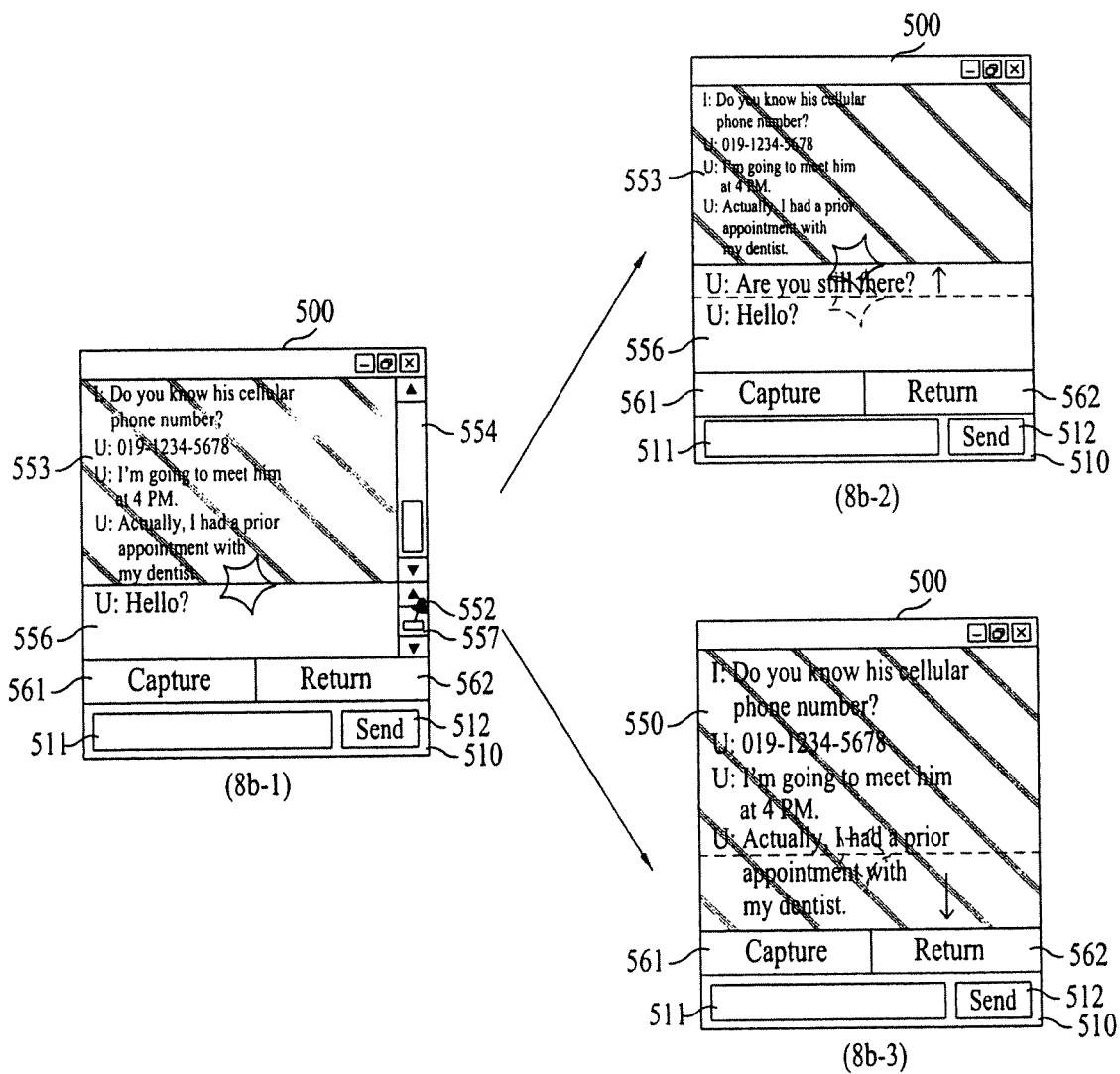

A method of controlling a mobile terminal according to a third embodiment of the present invention is explained with reference to FIG. 5, FIG. 8A and FIG. 8B. FIG. 8A and FIG. 8B are diagrams of a display screen on which a method of controlling a mobile terminal according to the third embodiment of the present invention is implemented.

Referring to (8a-1) of FIG. 8A, the instant message window 500 is displayed on the display screen of the mobile terminal 100 while the mobile terminal is performing instant message communication with another terminal [S51]. Messages currently transmitted/received by a mobile terminal 100 user or another party are displayed on the message output region 550 of the instant message window 500 [S52].

First and second icons 561, 562 for a message capture are displayed on the instant message window 500. The first and second icons 561, 562 were explained previously.

Subsequently, the user touches the first icon 561 [S53] to capture displayed messages. Referring to (8a-2) of FIG. 8A, messages displayed within the message output region 550 are captured and displayed.

Subsequently, if there is a message newly transmitted/received by the mobile terminal 100 user or the other party after the capturing timing point, the message output region 550, as shown in (8a-3) of FIG. 8A, is divided into two regions. Specifically, the message output region 550 is divided into a captured message output region 553 and a currently transmitted/received message output region 556.

The captured messages are then displayed on the captured message output region 553 in a reduced size. A predetermined number of messages newly transmitted/received by the mobile terminal 100 user or the other party are displayed on the currently transmitted/received message output region 556. In (8a-3) of FIG. 8A, it is shown that a most recent message is displayed on the currently transmitted/received message output region 556.

As the instant message communication continues, the message displayed on the captured message output region 553, as shown in (8a-4) of FIG. 8A, is maintained intact. Yet, a message newly transmitted/received by the mobile terminal 100 user or the other party is displayed on the currently transmitted/received message output region 556. Hence, the user is able to view the captured message while simultaneously viewing the newly transmitted/received message(s) [S55].

Subsequently, the user selects the second ion 562 to close the captured message output region 553. Referring to (8a-5)

of FIG. 8A, only the currently transmitted/received messages are displayed on the message output region 550 [S56].

The captured message output region 553 and the currently transmitted/received message output region 556 may be mutually adjusted in size. This is explained in detail with reference to FIG. 8B. Referring to (8b-1) of FIG. 8B, it is shown that the captured message output region 553 and the currently transmitted/received message output region 556 are displayed on the instant message window 500. If the user touches and drags a boundary line between the two regions, sizes of the two regions, as shown in (8b-2) or (8b-3) of FIG. 8B, may be mutually adjusted by dragging the boundary line.

Specifically, referring to (8b-2) of FIG. 8B, the size of the captured message output region 553 is reduced by the adjustment and the captured messages are further reduced to fit the reduced size of the captured message output region 553 such that they may be entirely displayed. As the size of the currently transmitted/received message output region 556 is increased, more messages may be displayed in the currently transmitted/received message output region 556. For example, a pair of most recently transmitted/received messages are displayed in the increased currently transmitted/received message output region 556 as shown in (8b-2) of FIG. 8B compared to one message displayed in (8b-1).

Referring to (8b-3) of FIG. 8B, the size of the captured message output region 553 is increased by the adjustment and the captured messages are increased to fit the size of the captured message output region 553 such that they may be entirely displayed. For example, the size of the currently transmitted/received message output region 556 is reduced to the minimum such that the most recently transmitted/received message is not displayed at all.

In the above description, the captured message was displayed intact on the instant message window 500 since the capturing timing point. Alternatively, the captured message may be displayed in response to a user's request after the capturing, for example, by inputting a display request signal. This is explained in detail with reference to FIG. 9 and FIG. 10.

Figure 9:
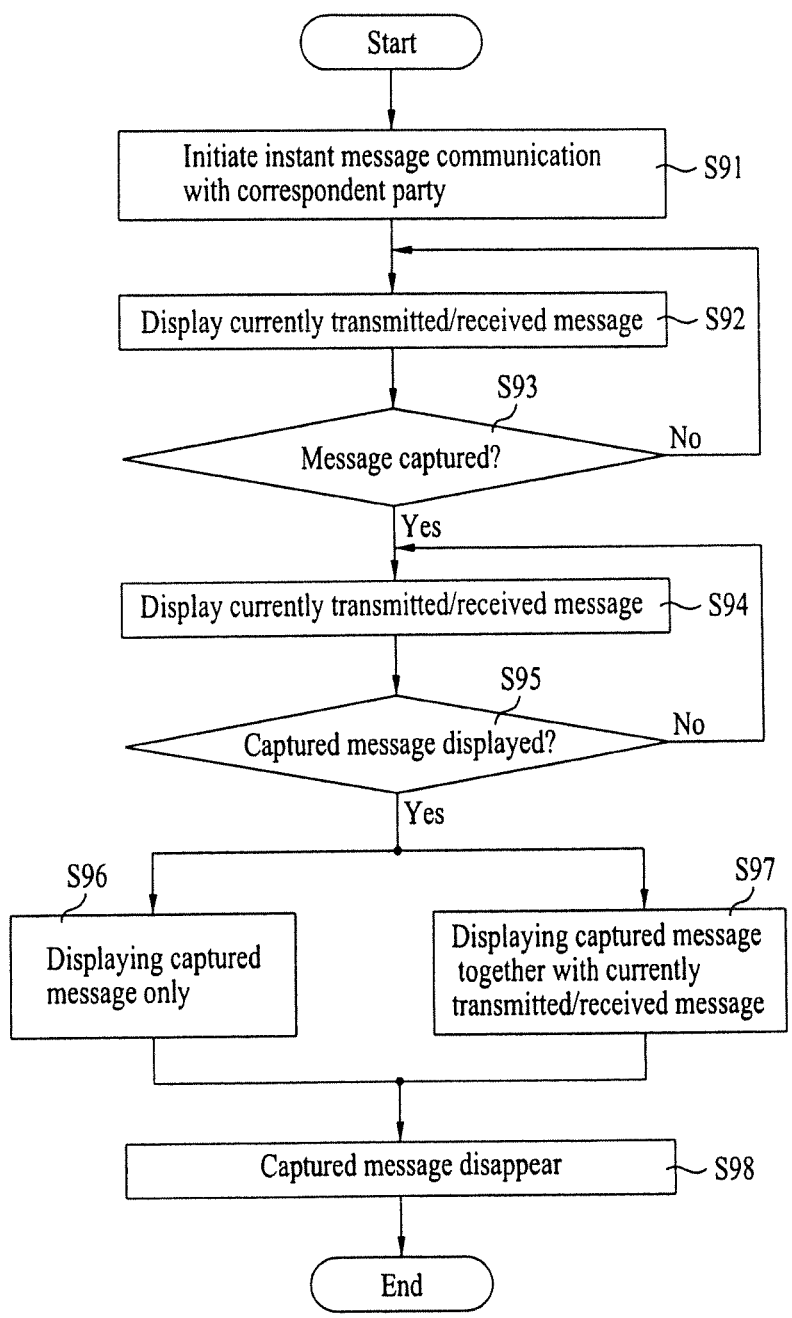
FIG. 9 is a flowchart illustrating a method of controlling a mobile terminal according to another embodiment of the present invention.
Figure 10:
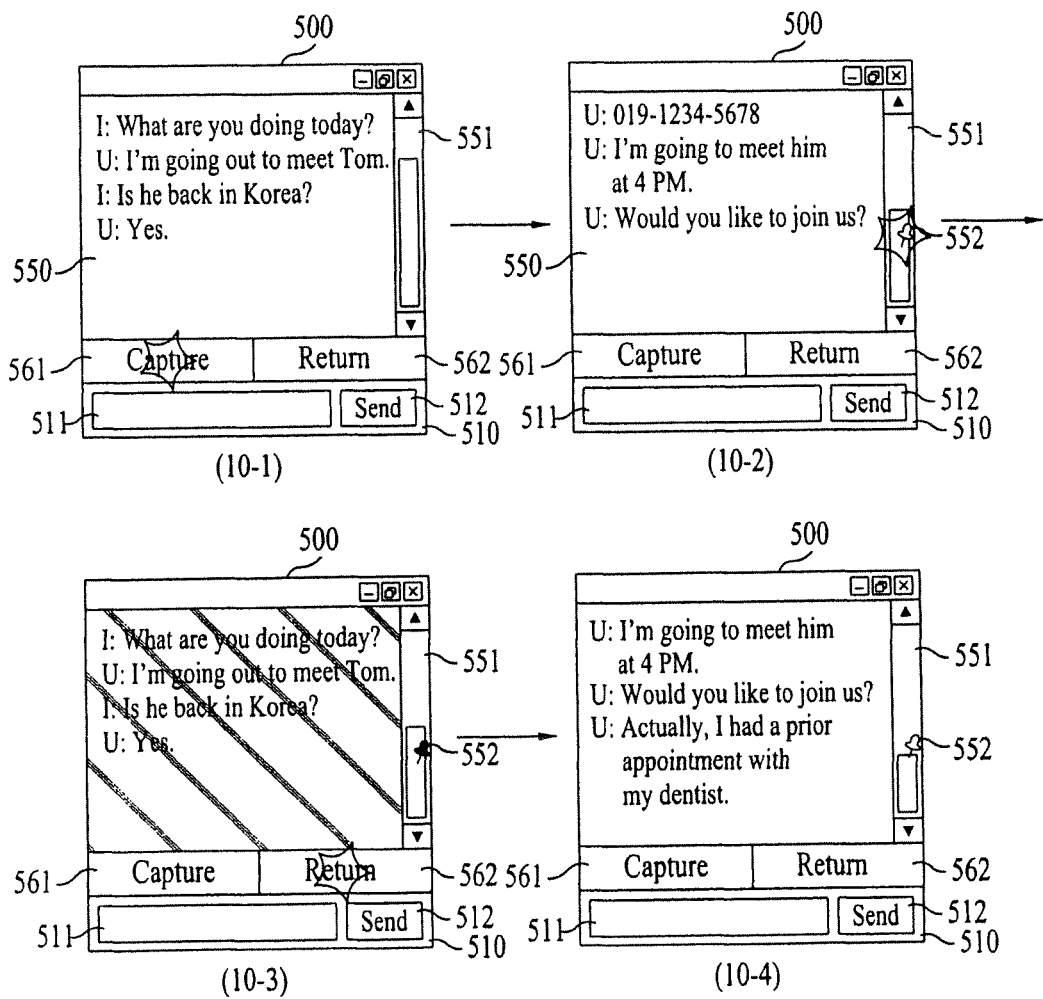
FIG. 10 is a diagram of a display screen on which a method of controlling a mobile terminal according to another embodiment of the present invention is implemented.

FIG. 9 is a flowchart illustrating a method of controlling a mobile terminal 100 according to a fourth embodiment of the present invention. FIG. 10 is a diagram of a display screen on which a method of controlling a mobile terminal according to the fourth embodiment of the present invention is implemented.

Referring to (10-1) of FIG. 10, the instant message window 500 is displayed on the display screen of the mobile terminal 100 while the mobile terminal is performing instant message communication with another terminal [S91]. Messages currently transmitted/received by a mobile terminal 100 user or another party are displayed on the message output region 550 of the instant message window 500 [S92]. As mentioned in the foregoing description, first and second icons 561, 562 for a message capture are displayed on the instant message window 500.

Subsequently, the terminal user selects the first icon 561 [S93]. Referring to (10-2) of FIG. 10, an indicator 552 indicating that there is a captured message is displayed on a scroll bar 551 of the message output region 550. Newly transmitted/received messages continue to be displayed on the message output region 550 [S94]. If the user touches the indicator 552, the display request signal is generated [S95].

Referring to (10-3) of FIG. 10, the captured messages are displayed [S96] in response to the touching of the indicator 552. In (10-3) of FIG. 10, only the captured messages are displayed on the instant message window 500. Alternatively, the captured messages may be displayed together with the currently transmitted/received messages as described above [S97].

Subsequently, the terminal user selects the second icon 562 to return to the message output region 550. Referring to (10-4) of FIG. 10, the captured messages are no longer displayed and only the currently transmitted/received messages are displayed on the message output region [S98].

Figure 11:
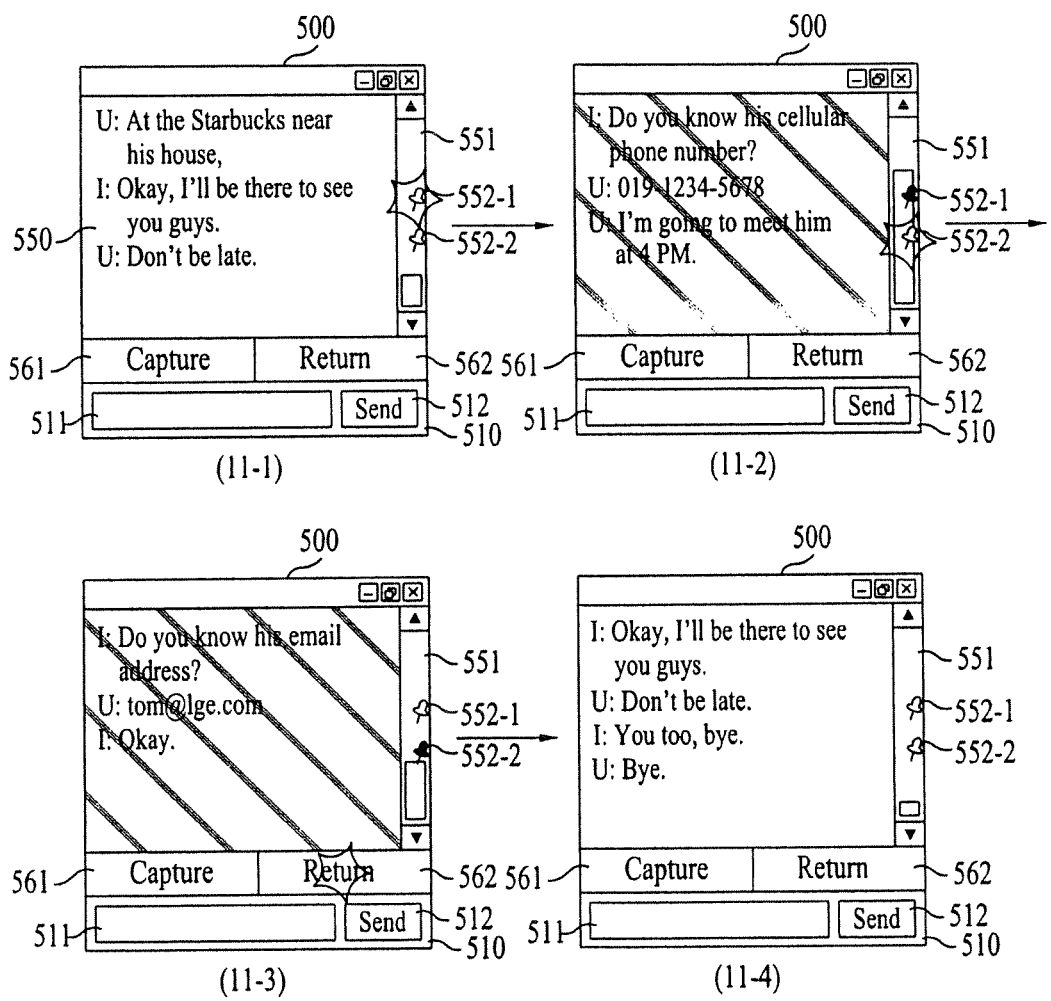
FIG. 11 is a diagram of a display screen on which a method of controlling a mobile terminal according to another embodiment of the present invention is implemented.

In the above examples, a capture is carried out only once in the course of the instant message communication. Yet, multiple captures may be performed. This is explained with reference to FIG. 11. FIG. 11 is a diagram of a display screen on which a method of controlling a mobile terminal 100 according to a fifth embodiment of the present invention is implemented.

Referring to (11-1) of FIG. 11, a pair of indicators, such as first and second indicators 552-1, 552-2, are displayed on the scroll bar 551 of the message output region 550. The first and second indicators 552-1, 552-2 indicate that there are two captures, such as first and second captures in the course of the instant message communication. It is apparent to those skilled in the art that the second capture can be performed in the same manner as the first capture performed in advance.

Subsequently, the user touches the first indicator 552-1. In response, first captured messages are displayed on the message output region 550, as shown in (11-2) of FIG. 11. The user then touches the second indicator 552-2. In response, second captured messages are displayed on the message output region 550, as shown in (11-3) of FIG. 11.

Subsequently, the user touches the second icon 562 to return to the message output region 550 displaying the recent messages. In response, currently transmitted/received messages are displayed again on the message output region 550, as shown in (11-4) of FIG. 11.I It is understood that this embodiment for performing at least two captures in the course of the instant message communication is applicable to other embodiments of the present invention.

Figure 12:
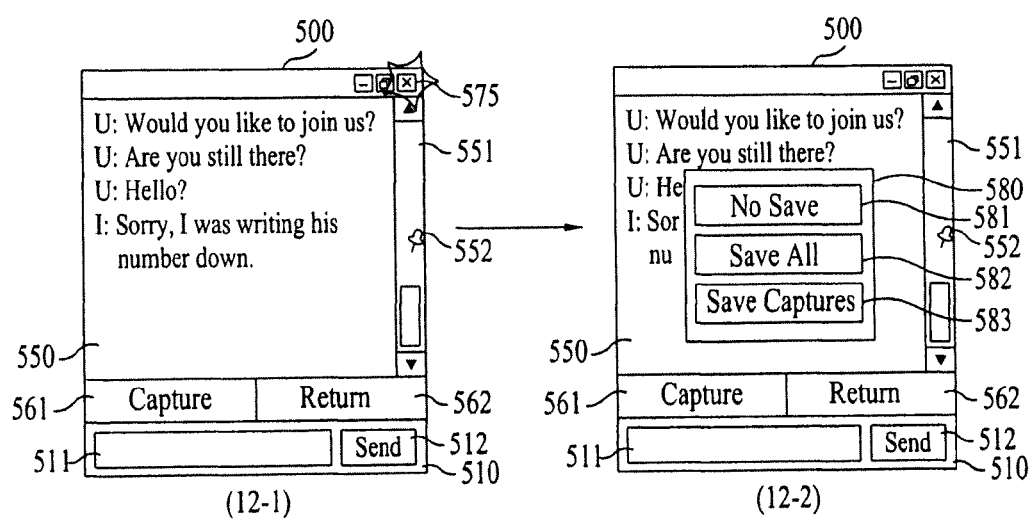
FIG. 12 is a diagram of a display screen on which a method of controlling a mobile terminal according to another embodiment of the present invention is implemented.

After completion of the instant message communication, a portion or of the entire message communication contents may be stored. A method of controlling a mobile terminal 100 according to a sixth embodiment of the present invention is explained with reference to FIG. 12. FIG. 12 is a diagram of a display screen on which a method of controlling a mobile terminal 100 according to the sixth embodiment of the present invention is implemented.

Referring to (12-1) of FIG. 12, a user touches an end icon 575 to end the instant message communication. Referring to (12-2) of FIG. 12, a window 580 including option icons 581, 582, and 583 is displayed on the instant message window 500 to prompt the user for storing a portion or the entire instant message communication.

If the user selects the 'No Save' icon 581, the instant message communication ends without saving its contents. If the user selects the 'Save All' icon 582, the instant message communication ends after saving its contents. If the user selects the 'Save Captures' icon 583, the instant message communication ends after saving only messages captured in the course of the instant message communication. The saved messages may be displayed on the mobile terminal 100 in response to the user's request after the instant message communication ended.

Figure 13:
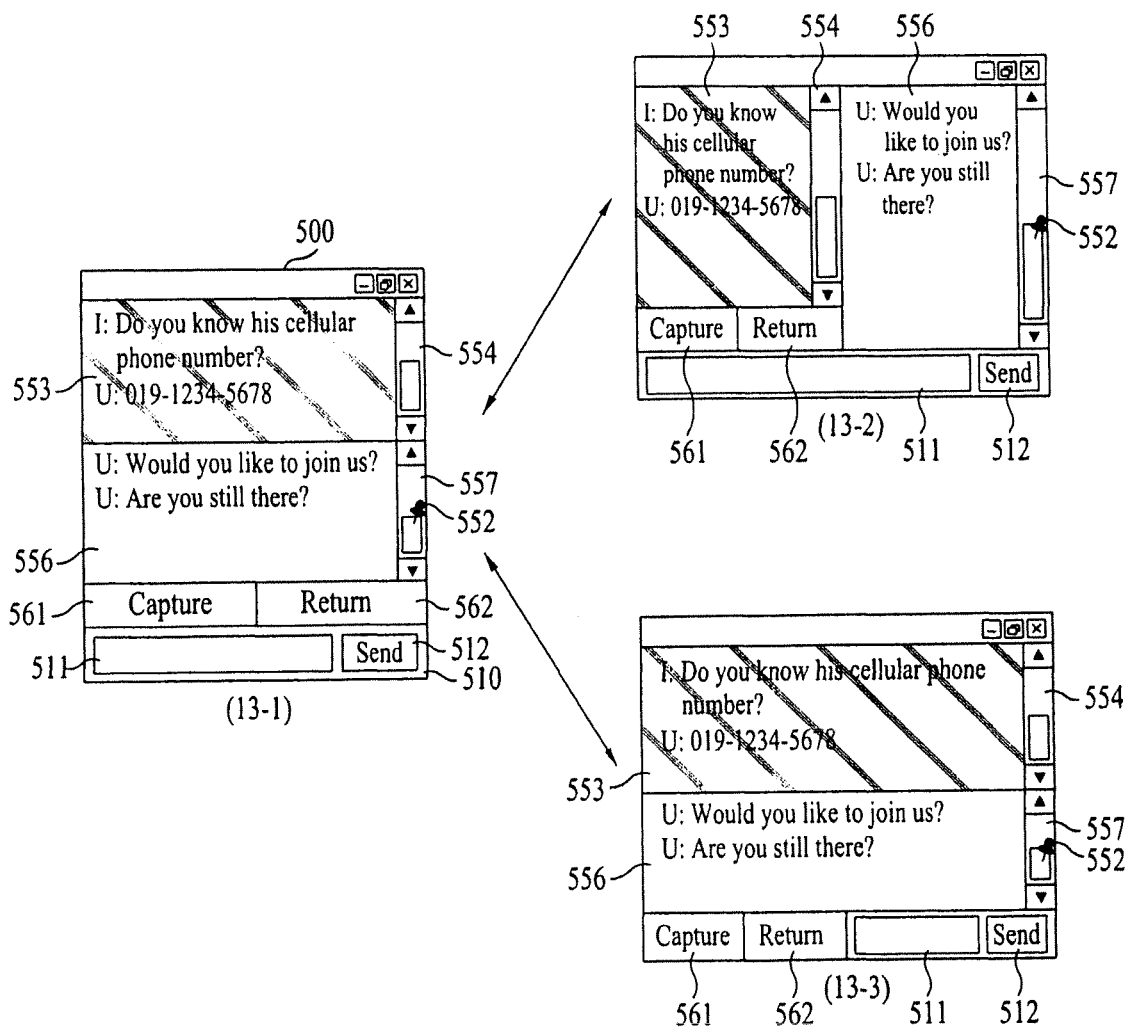
FIG. 13 is a diagram of a display screen on which a method of controlling a mobile terminal according to another embodiment of the present invention is implemented.

In the above description, the mobile terminal 100 displays the instant message window 500 vertically along the length of the mobile terminal. Alternatively, the orientation of the instant message window 500 may be horizontal, such that it is rotated 90 degrees from the above configuration. In this case, the orientation of the instant message window may be configured automatically or manually. For this, a method of controlling a mobile terminal 100 according to a seventh embodiment of the present invention is explained with reference to FIG. 13. FIG. 13 is a diagram of a display screen on which a method of controlling a mobile terminal 100 according to the seventh embodiment of the present invention is implemented.

Referring to (13-1) of FIG. 13, the orientation of the instant message window 500 is vertical. The instant message window 500 includes a captured message output region 553 and a currently transmitted/received message output region 556. Specifically, the two regions 553, 556 are arranged next to each other or as upper and lower regions in a vertical direction.

Referring to (13-2) of FIG. 13, the orientation of the instant message window 500 is in a horizontal direction. The captured message output region 553 and the currently transmitted/received message output region 556 are displayed side-by-side or on the left and right, respectively. The captured message output region 553 and the currently transmitted/received message output region 556 of the message output region 550 may be automatically or manually arranged in the horizontal direction.

The automatic arrangement may be carried out by the sensing unit 140 when the orientation is switched by sensing the spatial direction of the mobile terminal 100. The manual arrangement may also be carried out by a separate key manipulation of the user input unit 130.

Referring to (13-3) of FIG. 13, the captured message output region 553 and the currently transmitted/received message output region 556 of the message output region 550 may be automatically or manually arranged in a vertical direction or as upper and lower regions, respectively. It is apparent to those skilled in the art that the automatic or manual arrangement can be carried out in the other embodiments of the present invention explained in this disclosure.

In the above embodiments, all messages displayed on the message output region 550 are captured. Alternatively, a portion of messages on the message output region 550 may be selectively captured as well.

Figure 14:
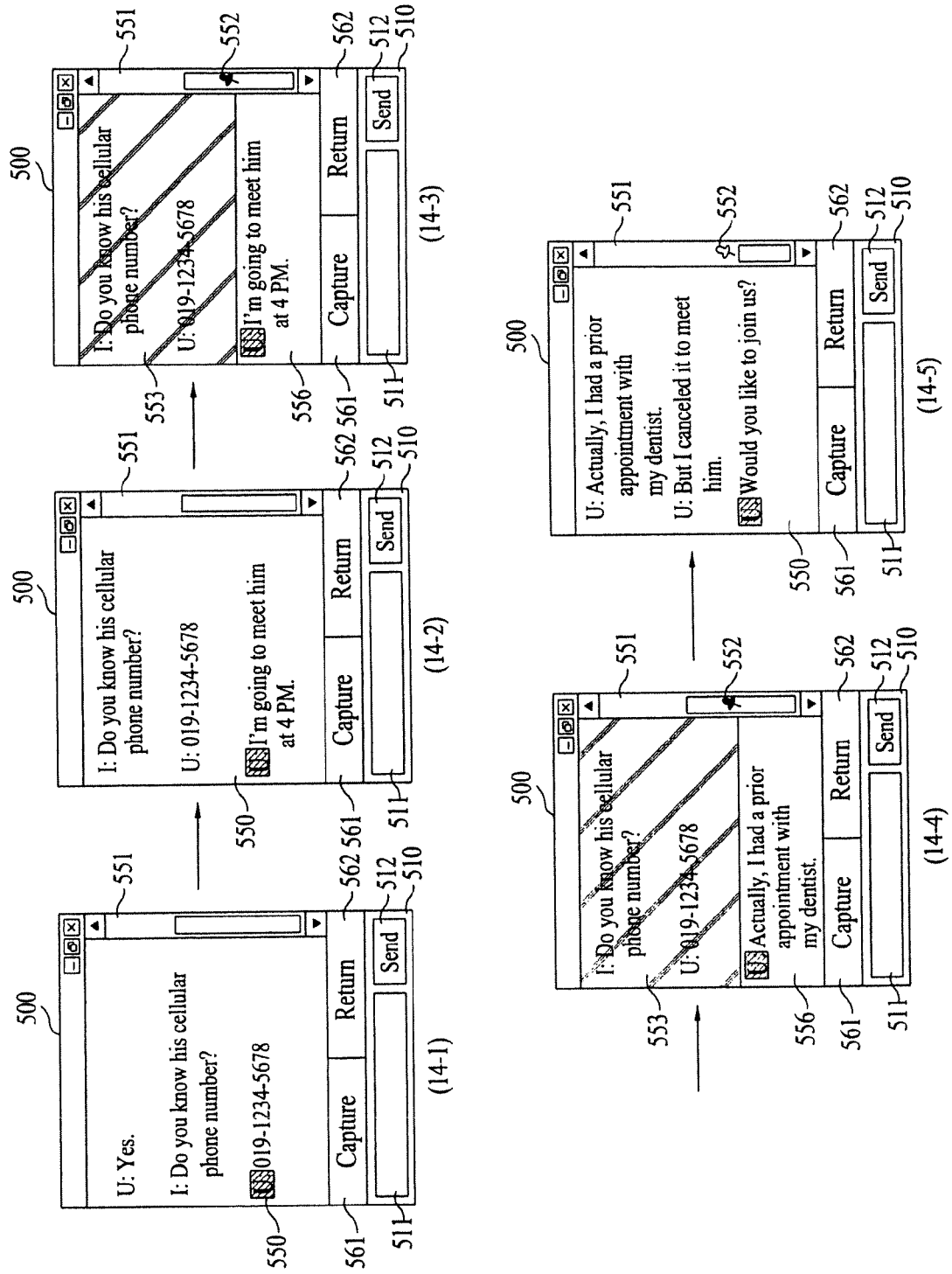
FIG. 14 is a diagram of a display screen on which a method of controlling a mobile terminal according to another embodiment of the present invention is implemented.

A method of controlling a mobile terminal 100 according to an eighth embodiment of the present invention is explained with reference to FIG. 14. FIG. 14 is a diagram of a display screen on which a method of controlling a mobile terminal 100 according to the eighth embodiment of the present invention is implemented.

Referring to (14-1) and (14-2) of FIG. 14, currently transmitted/received messages are sequentially displayed on the message output region 550. A prescribed number of the most recently transmitted/received messages are displayed from among the displayed messages such that they may be visually discriminated from others. There are many ways of visually discriminating the messages from each other.

Subsequently, a user selects a first icon 561 to capture the displayed messages. Referring to (14-3) of FIG. 14, the displayed messages, other than the most recently transmitted/received messages or messages transmitted/received after capturing the previously displayed messages are captured in response to the selection of the first icon 561.

Referring to (14-3) and (14-4) of FIG. 14, the prescribed number of the most recently transmitted/received messages are displayed on a currently transmitted/received message output region 556 of the message output region 550 while the captured messages are displayed on a captured message output region 553 of the message output region. While the same captured messages are continuously displayed on the captured message output region 553, a prescribed number of the most recently transmitted/received messages are displayed on the sequentially updated currently transmitted/received message output region 556 when a message is newly transmitted/received by the mobile terminal 100 user or another party.

Subsequently, the user selects a second icon 562 to close the captured message output region 553. Referring to (14-5) of FIG. 14, only the currently transmitted/received messages are again displayed on the message output region 550 in response to the selection of the second icon 562.

In the above description of the eighth embodiment of the present invention, the messages are captured in a specific area of the message output region 550. Alternatively, at least one message selected by a user from among messages on the message output region 550 is captured.

Figure 15:
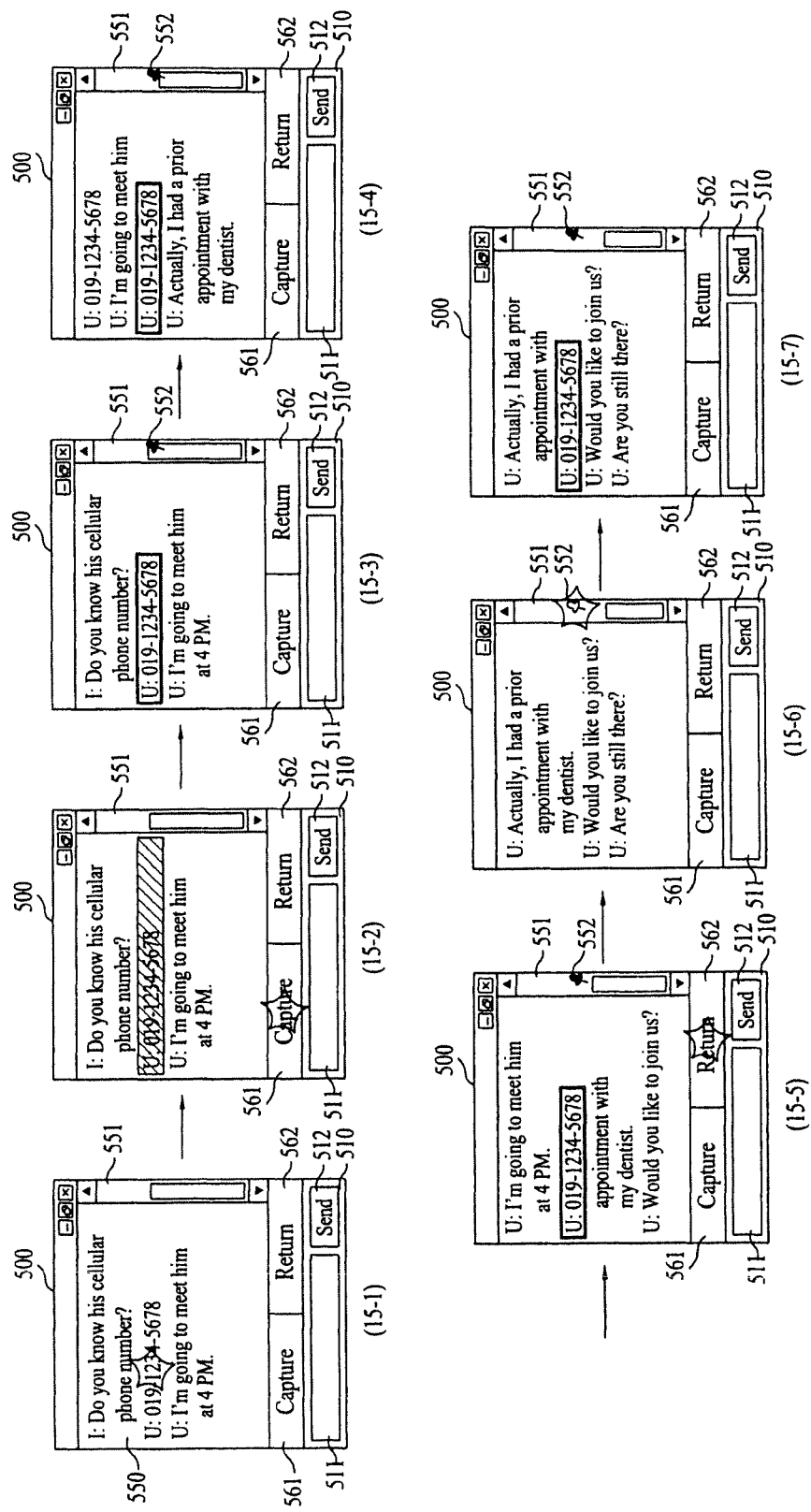
FIG. 15 and FIG. 16 are diagrams of a display screen on which a method of controlling a mobile terminal according to another embodiment of the present invention is implemented.
Figure 16:
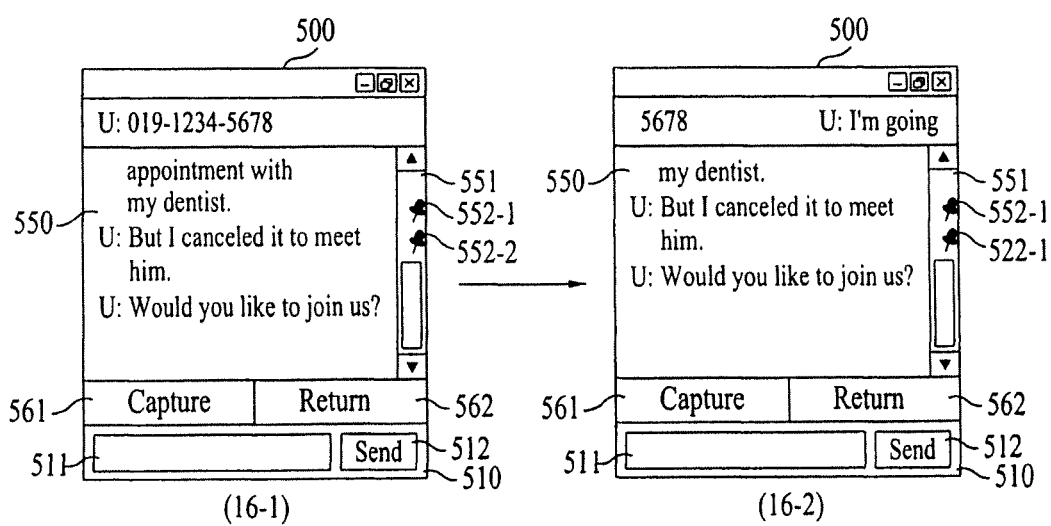

A method of controlling a mobile terminal 100 according to the ninth embodiment of the present invention is explained with reference to FIG. 15 and FIG. 16. FIG. 15 and FIG. 16 are diagrams of a display screen on which a method of controlling a mobile terminal 100 according to the ninth embodiment of the present invention is implemented.

Referring to (15-1) of FIG. 15, currently transmitted/received messages are sequentially displayed on the message output region 550. A user selects at least one of the displayed messages for capture. Referring to (15-2) of FIG. 15, it is indicated that at least one message has been selected.

The user then selects a first icon 561 to capture the selected message. Referring to (15-3) of FIG. 15, the at least one message is captured and then displayed at a position where the at least one message was located at the capturing timing point. An indicator 552 indicating that the at least one message has been captured is generated on the scroll bar 551.

Referring to (15-3) and (15-4) of FIG. 15, while a new message is displayed as it is transmitted/received by the mobile terminal 100 user or another party after the capturing timing point, the captured message continues to be displayed at a fixed position. Subsequently, the user selects a second icon 562 to close the captured message from the message output region 550.

In response to the selection of the second icon 562, the captured message disappears from the message output region 550. If the terminal user selects the indicator 552 to retrieve the captured message, the captured message is displayed again on the message output region 550, as shown in (15-7) of FIG. 15.

In (15-7) of FIG. 15, the captured message may be displayed at a different position on the message output region 550 although the captured message is displayed at the originally captured position. This is explained in detail with reference to FIG. 16.

Referring to (16-1) and (16-2) of FIG. 16, a pair of indicators 552-1 and 552-2 are displayed on the scroll bar 551 to indicate that there are a pair of captured message. Both of the captured messages are displayed by scrolling right to left on an upper end of the message output region 550. Optionally, one of the two captured messages, which corresponds to one of the indicators selected by the user, may displayed only on the upper end of the message output region 550.

Figure 17:
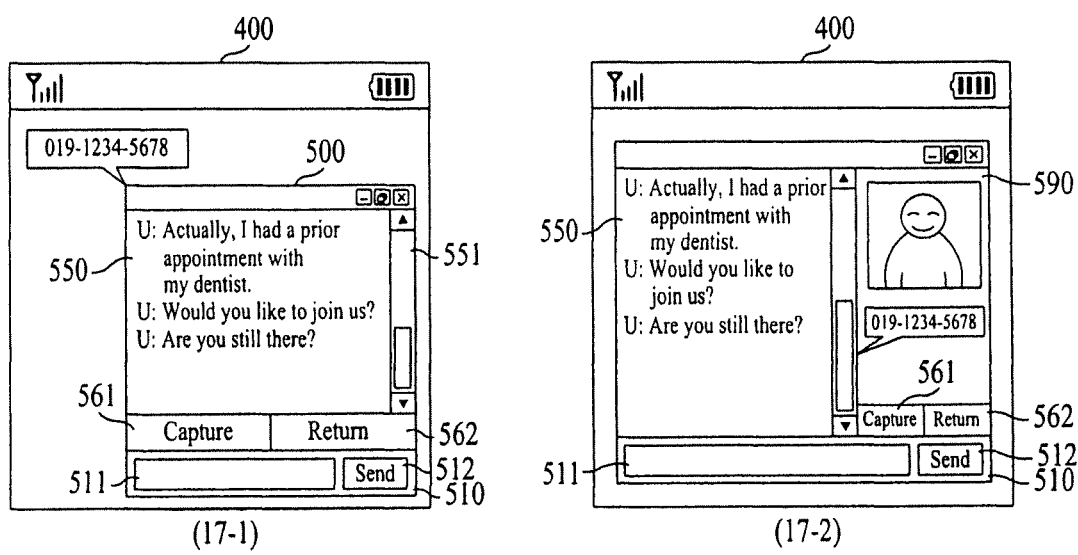
FIG. 17 is a diagram of a display screen on which a method of controlling a mobile terminal according to another embodiment of the present invention is implemented.

In the above examples, the captured message is displayed within the message output region 550. Alternatively, the captured message may be displayed outside the message output region 550. A method of controlling a mobile terminal 100 according to a tenth embodiment of the present invention is explained with reference to FIG. 17. FIG. 17 is a diagram of a display screen on which a method of controlling a mobile terminal 100 according to the tenth embodiment of the present invention is implemented.

Referring to (17-1) of FIG. 17, the instant message window 500 occupies a partial area of a display screen 400 of the mobile terminal 100. The captured message may be displayed on the display screen 400, but not on the instant message window 500. Referring to (17-2) of FIG. 17, when the instant message window 500 includes an extra region 590 in addition to the message input region 510 and the message output region 550, the captured message may be displayed on the extra region.

The present invention provides several effects or advantages. First, an important message is captured or frozen and displayed without scrolling while new messages are transmitted/received in the course of instant message communication. Therefore, a user is able to view the captured message fixed at a specific region of a display screen in the course of the instant message communication. Second, both a captured message and a currently transmitted/received message are simultaneously displayed. Therefore, a user is able to view the currently transmitted/received message without being interrupted by the captured message.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for controlling display of a message window, the method comprising:
    displaying the message window including a message input region and a message output region;
    receiving a plurality of incoming messages that are displayed in the message output region;
    freezing the message output region, wherein messages currently displayed in the message output region remain displayed in the message output region while the message output region is frozen and wherein newly received incoming messages are not displayed in the message output region while the message output region is frozen; and
    receiving input of a new outgoing message via the message input region, wherein the frozen message output region is continuously displayed until commencement of the receiving of the input of the new outgoing message.

2. The method of claim 1, further comprising:
    no longer freezing the message output region upon the commencement of the receiving of the input of the new outgoing message; and
    displaying, in the message output region, at least one incoming message received while the message output region was frozen.

3. The method of claim 1, further comprising receiving input for performing a function.

4. The method of claim 3, wherein the received input comprises a first input, the method further comprising:
    no longer freezing the message output region in response to the receiving of the first input; and
    displaying, in the message output region, at least one incoming message received while the message output region was frozen.

5. The method of claim 4, wherein the first input is received via a button or a soft key, the method further comprising:
    receiving a second input via the button or soft key; and
    redisplaying, in the message output region, the messages that were displayed in the frozen message output region, in response to the received second input.

6. The method of claim 3, wherein the received input comprises a first input, the method further comprising:
    displaying a prompt for saving at least one message in the frozen message output region when the first input is received; and
    saving the at least one message in response to the receiving of input to save the at least one message.

7. The method of claim 3, wherein the function comprises transitioning between displaying the messages that are displayed in the message output region while the message output region is frozen, and displaying incoming messages that are newly received in the message output region.

8. The method of claim 1, further comprising saving the frozen message output region for later retrieval.

9. The method of claim 1, further comprising displaying an indicator indicating the freezing of the message output region.

10. The method of claim 9, further comprising retrieving the frozen message output region in response to selection of the indicator.

11. The method of claim 1, further comprising no longer freezing the message output region in response to receiving input via an input key.

12. A terminal, comprising:
    a display configured to display a message window including a message input region and a message output region;
    a communication device configured to enable message communication;
    memory configured to store at least one message; and
    a controller configured to freeze the message output region, wherein messages currently displayed in the message output region remain displayed in the message output region while the message output region is frozen and wherein newly received incoming messages are not displayed in the message output region while the message output region is frozen, and to recognize the receiving of input of a new outgoing message via the message input region, wherein the frozen message output region is continuously displayed until commencement of the receiving of the input of the new outgoing message.

13. The terminal of claim 12, wherein the controller is further configured to:
    no longer freeze the message output region upon the commencement of the receiving of the input of the new outgoing message; and
    display, in the message output region, at least one incoming message received while the message output region was frozen.

14. The terminal of claim 12, wherein the controller is further configured to recognize received input for performing a function.

15. The terminal of claim 14, wherein:
    the received input comprises a first input; and
    the controller is further configured to:
        no longer freeze the message output region in response to the receiving of the first input, and
        display, at least one incoming message received while the message output region was frozen, in the message output region.

16. The terminal of claim 15, further comprising a button or a soft key configured to receive the first input and a second input, wherein the controller is further configured to redisplay, in the message output region, in response to the received second input, the messages that were displayed in the frozen message output region.

17. The terminal of claim 14, wherein:
the received input comprises a first input; and
the controller is further configured to:
- display a prompt for saving at least one message in the frozen message output region when the first input is received, and
- save the at least one message in the memory in response to the receiving of input to save the at least one message.

18. The terminal of claim 14, wherein the function comprises transitioning between displaying the messages that are displayed in the message output region while the message output region is frozen and displaying incoming messages that are newly received in the message output region.

19. The terminal of claim 12, wherein the controller is further configured to save the frozen message output region in the memory for later retrieval.

20. The terminal of claim 12, wherein the controller is further configured to cause the display to display an indicator indicating the freezing of the message output region.

21. The terminal of 20, wherein the controller is further configured to retrieve the frozen message output region in response to selection of the indicator.

22. The terminal of claim 12, further comprising an input key, wherein the controller is further configured to no longer freeze the message output region in response to receiving input via the input key.

* * * * *